(12) United States Patent
Steinborn et al.

(10) Patent No.: US 8,066,617 B2
(45) Date of Patent: Nov. 29, 2011

(54) METHOD FOR CONTROLLING SHIFTS IN AN AUTOMATED STEP-DOWN TRANSMISSION

(75) Inventors: Mario Steinborn, Friedrichshafen (DE); Jochen Breuer, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 381 days.

(21) Appl. No.: 12/405,507

(22) Filed: Mar. 17, 2009

(65) Prior Publication Data

US 2009/0239704 A1 Sep. 24, 2009

(30) Foreign Application Priority Data

Mar. 18, 2008 (DE) .................... 10 2008 000 752
Sep. 25, 2008 (DE) .................... 10 2008 042 345

(51) Int. Cl.
*H02P 17/00* (2006.01)
(52) U.S. Cl. ............... 477/15; 477/46; 477/49
(58) Field of Classification Search .......... 477/15, 477/46, 49, 55, 57, 63, 68, 4; 475/302, 303, 475/207, 218, 169; 474/28, 18, 19; 74/473.11, 74/325, 339
See application file for complete search history.

(56) References Cited

U.S. PATENT DOCUMENTS

| | | | | |
|---|---|---|---|---|
| 4,545,263 A | * | 10/1985 | Fickelscher | 475/169 |
| 5,704,460 A | * | 1/1998 | Leimbach | 192/70.252 |
| 5,711,730 A | * | 1/1998 | Friedman et al. | 474/18 |
| 5,879,253 A | * | 3/1999 | Friedmann et al. | 474/18 |
| 5,970,810 A | | 10/1999 | Wadas | |
| 6,012,345 A | | 1/2000 | Wafzig et al. | |
| 6,105,449 A | * | 8/2000 | Genise et al. | 74/335 |
| 6,196,944 B1 | * | 3/2001 | Schmitz | 475/303 |
| 6,318,211 B1 | | 11/2001 | Nitzschke et al. | |
| 6,336,878 B1 | * | 1/2002 | Ehrlich et al. | 474/28 |
| 7,021,170 B2 | | 4/2006 | Dobele | |
| 7,798,937 B2 | * | 9/2010 | Gitt | 475/302 |
| 2009/0107270 A1 | * | 4/2009 | Krieger et al. | 74/339 |
| 2009/0205450 A1 | * | 8/2009 | Gitt | 74/325 |
| 2009/0301248 A1 | * | 12/2009 | Mohr et al. | 74/473.11 |

FOREIGN PATENT DOCUMENTS

| | | |
|---|---|---|
| DE | 197 53 061 C1 | 6/1999 |
| DE | 197 54 726 A1 | 6/1999 |
| DE | 101 52 857 A1 | 5/2003 |
| DE | 69908692 | 5/2004 |
| DE | 102007010829 | 11/2008 |
| EP | 1 588 080 B1 | 10/2005 |
| WO | 03/036137 | 5/2003 |
| WO | 2004/079233 A1 | 9/2004 |

\* cited by examiner

*Primary Examiner* — Hau Phan
(74) *Attorney, Agent, or Firm* — Davis & Bujold, P.L.L.C.

(57) ABSTRACT

A method of controlling an automated step-down transmission, arranged in a drivetrain between an engine and a drive axle, which includes a multi-stage main transmission and a range group. The main transmission has an intermediate transmission style with a countershaft having a transmission brake and an input shaft connected, via a clutch, to the engine. The main transmission shifts, without being synchronized, and the range group shifts, after synchronization, such that the engaged gear ratio of the main transmission remains engaged during a range shift operation. The range shift is accomplished by firstly reducing drive engine torque; secondly, disengaging the existing gear ratio of the range group; thirdly, remotely synchronizing the target gear ratio in the range group; fourthly, engaging the target gear ratio in the range group; and fifthly, increasing the drive engine torque.

16 Claims, 3 Drawing Sheets

METHOD FOR CONTROLLING SHIFTS IN AN AUTOMATED STEP-DOWN TRANSMISSION

This application claims priority from German patent application serial no. 10 2008 000 752.8 filed Mar. 18, 2008, and also claims priority from German patent application serial no. 10 2008 042 345.9 filed Sep. 25, 2008.

FIELD OF THE INVENTION

The invention concerns a method for controlling shifts in an automated step-down transmission arranged in a drivetrain of a motor vehicle between a drive engine and a drive axle and comprises at least a multi-stage main transmission and, downstream therefrom, a range group, and in which the main transmission has an intermediate transmission structure with at least one countershaft provided with a controllable transmission brake, an input shaft being connected to the drive engine via a separate clutch, such that the main transmission can be shifted unsynchronized and the range group after synchronization, and such that the transmission ratio engaged in the main transmission before and after the range shift is identical.

BACKGROUND OF THE INVENTION

Step-down transmissions with a multi-stage main transmission and, downstream from it, a range group and sometimes also with a splitter group in drive connection upstream or downstream of the main transmission, have been known for a long time and are preferably used in commercial vehicles. By means of, for example, a two-stage splitter group with a gear ratio interval corresponding to approximately half of an average gear ratio interval between two successive ratio steps of the main transmission, the gear ratio intervals of the main transmission are halved and the total number of gears of the step-down transmission available is doubled. By means of a usually two-stage range group with a gear ratio interval over the overall ratio interval of the main transmission by approximately an average ratio interval between two successive ratio steps of the main transmission, the spread of the transmission gear ratios as a whole is approximately doubled and the total number of gears of the step-down transmission available is again doubled.

From this, in combination with a three-step main transmission (with three forward transmission ratio steps and one reverse ratio step) a 12-gear step-down transmission is obtained, having a total of twelve forward gears and a maximum of four reverse gears, and in combination with a four-step main transmission (with four forward ratio steps and one reverse ratio step) a 16-gear step-down transmission is obtained, having a total of sixteen forward gears and a maximum of four reverse gears.

Compared with a single transmission having a comparable number of gears and similar gear intervals and ratio spread, a step-down transmission of the above type has substantially more compact dimensions and is lighter. However, since many shifts in a step-down transmission require a change of gear ratio steps in a plurality of partial transmissions and thus take place with a relatively complex sequence, most known step-down transmissions are made to be shifted in a partially or fully automated manner.

From the model series of automated shift transmissions known as the AS-Tronic family, produced by the present applicant, the transmissions of the AS-Tronic mid-series, designed for medium-weight commercial vehicles, and the transmissions of the AS-Tronic series, provided for heavy commercial vehicles, are all made as step-down transmissions with a multi-stage main transmission HG, i.e. one having three or four forward ratio steps, with a two-stage splitter group GV upstream from the main transmission HG, and with a two-stage range group GP downstream from the main transmission HG. In each case, the main transmission HG is made as a transfer structure and can be shifted unsynchronized, i.e. with unsynchronized claw-type clutches, and in the case of the AS-Tronic mid-series they have a single countershaft while in the case of the AS-Tronic series, for reasons relating to weight and structural space optimization, they have two countershafts. In both series the main transmission HG is optionally available in a direct-gear version ($i_{HG\_min}=1$) or in a rapid-gear version ($i_{HG\_min}<1$). The splitter group GV is in each case made as a step-down transmission with two synchronized input constants for the main transmission, i.e. ones that can be shifted by means of friction-synchronized shift clutches. In each case the range group GP is made as a synchronously shifted, two-stage planetary transmission with a shiftable direct connection ($i_{GP}=1$) and an alternatively switchable high ratio ($i_{GP}\gg1$).

A typical method for controlling shifts in a step-down transmission is known from DE 197 54 726 B4. This known method, however, relates to a semi-automatically shiftable step-down transmission with a manually shifted main transmission H and, downstream therefrom, a combination of an automated-shift, two-stage splitter group S and an automated-shift, two-stage range group R, whose gear and shift clutches are all friction-synchronized. The method concerned provides that for a gear change, first the main transmission H, then the splitter group S and then the range group R are shifted to a neutral position, and then first the range group R and after it the splitter group S are shifted to their respective target ratio stages, and finally the main transmission H is shifted to its target ratio. This makes for rapid shift processes and relatively low shift and load forces during the shifting of the gear and shift clutches of the partial transmissions.

In contrast, DE 101 52 857 A1 describes a method for controlling shifts in an automated step-down transmission, i.e. one that can be shifted fully automatically. This known method relates to a step-down transmission with a multi-stage, claw-shifted main transmission, i.e. one that can be shifted without synchronization, a synchronized splitter group upstream therefrom with two ratio steps and, downstream from the main transmission, an unsynchronized range group with two ratio steps. Essentially this method provides that for a range shift, i.e. a shift that entails a change of the ratio step in the range group, the splitter group and the range group are each first shifted to their neutral position in order to interrupt the force flow, the main transmission is then braked by means of a transmission brake, and a change of the speed of the drive engine to the synchronous speed of the target gear begins. When the target ratio step of the main transmission has been engaged the splitter group is synchronously shifted to its target ratio step. When the drive engine reaches the synchronous speed, the target ratio step of the range group is then engaged.

Since the above-mentioned methods each relate to a special design form of a step-down transmission that is different from the step-down transmission considered above, these known methods cannot without further ado be transferred to an automated step-down transmission that comprises a multi-stage unsynchronized main transmission HG and a downstream synchronized range group GP, sometimes also with a synchronized splitter group GV upstream or downstream from the main transmission HG. In an automated step-down transmission of such structure a range shift usually takes place in such manner that after reducing the load on the drive engine and if necessary also after disengaging the separator clutch, the main transmission HG is first shifted to its neutral position, then the range group GP and, if needs be, also a splitter group GV if present, are synchronously shifted to their respective target ratio steps, and finally the main transmission HG is separately synchronized, i.e. the shift clutch of the target ratio step concerned is synchronized for example by means of a transmission brake and/or, with the separator clutch at least partially engaged, by corresponding speed control of the drive engine, before the target ratio step of the main transmission HG is engaged.

Having regard to a shift sequence as rapid and with as little wear as possible, however, the above process sequence has the advantage that a shift within the main transmission HG also takes place when the ratio step engaged in the main transmission HG before and after a range shift is identical, i.e. no ratio step change ever takes place in the main transmission HG. This problem relates in particular to shifts between several reverse gears which, when only one reverse ratio step R of the main transmission HG is present as usual, are formed by the ratio steps of the range group GP and perhaps of a splitter group GV if there is one. When the range group GP downstream from the main transmission HG is shifted, then if the reverse ratio step R is engaged the associated shift clutches are affected by the additional problem that by virtue of the configuration concerned the interlock synchronizations involved usually only function when the input shaft (output shaft of the main transmission) is rotating in the forward direction and are not effective, or only to a limited extent, when the input shaft is rotating backward.

SUMMARY OF THE INVENTION

Against this background the purpose of the present invention is to indicate a method for controlling shifts in an automated step-down transmission of the type described to begin with, by means of which range shifts, i.e. range upshifts and range downshifts in which the ratio step engaged in the main transmission HG before and after the shift remains identical, can be carried out more simply, more rapidly and with less wear.

This objective is achieved in that during the range shift the gear ratio step engaged in the main transmission HG, for example the reverse ratio step R, remains engaged and the range shift is carried out in the following steps:

S1) Load reduction by reducing the torque of the drive engine

S2) Disengagement of the existing ratio step (L; S) in the range group (GP=N)

S3) Remote synchronization of the target ratio step (S; L) in the range group GP S4) Engagement of the target ratio step (S; L) in the range group GP S5) Load build-up by increasing the torque of the drive engine.

Accordingly, the method of the invention begins with an automated step-down transmission arranged in a drivetrain of a motor vehicle between a drive engine and a drive axle, and comprises at least a multi-stage main transmission HG and, downstream from it, a preferably two-stage range group GP. The main transmission HG has an intermediate transmission structure with at least one countershaft $W_{VG1}$ provided with a controllable transmission brake Br, and the input shaft $W_{GE}$ is connected with the drive engine via a controllable separator clutch K. The main transmission HG is claw-shifted, i.e. it can be shifted by means of unsynchronized shift clutches S1, S2, the shift clutches of the range group GP are friction-synchronized. Optionally, the step-down transmission to which the invention relates can also comprise a preferably two-stage splitter group GV, which can also be shifted after synchronization and which is in drive connection with the main transmission HG upstream or downstream therefrom.

With a step-down transmission of this type a range shift, in which the ratio step engaged in the main transmission HG remains engaged before and after the shift, entails at least one shift of the range group GP from an existing (current) ratio step to a target ratio step, for example in a range upshift of a two-stage range group GP a shift from the ratio step L of the slow-driving range to the ratio step S of the fast-driving range.

For this to take place in as simple, rapid and low-wear manner as possible, according to the invention it is provided that the ratio step engaged in the main transmission HG at the beginning of the range shift remains engaged during the range shift. The sequence of the range shift according to the invention is such that a load reduction, i.e. a reduction of the torque transferred by the step-down transmission, first takes place by reducing the torque of the drive engine, before the existing ratio step of the range group GP, for example in a range upshift the ratio step L for the slow-driving range, is disengaged and largely free from load (GP=N). Then the target ratio step of the range group GP, i.e. in a range upshift the ratio step S for the fast-driving range, is separately synchronized relative to the associated shift clutch. Thereafter the target ratio step of the range group GP is engaged largely without load, before the range shift is completed with the load build-up produced by increasing the drive engine torque.

The process sequence according to the invention can be used both for a range upshift and a range downshift in a step-down transmission with or without a splitter group GV upstream or downstream from the main transmission. The form described above is the simplest variant of the method, in which the separator clutch K remains engaged during the shift and a splitter group GV, if present, is not shifted.

By virtue of the not shifting the main transmission HG, the fact that the separator clutch K is not disengaged and re-engaged, and the separate synchronization of the range group, a particularly simple and rapid shift process is achieved. In addition the corresponding components, such as the shift clutches of the part-transmissions HG and GP, the friction elements of the separator clutch K and the shift control elements of the part-transmissions HG, GP and that of the separator clutch K are used sparingly, which results in a longer useful life of the step-down transmission. The method according to the invention is preferably used for a shift between two reverse gears, i.e. when the reversing ratio step R is engaged in the main transmission HG, in which case the interlock synchronizations of the range group GP are usually ineffective. However, when the initial conditions are satisfied, i.e. when the ratio step in the main transmission HG is identical before and after a range shift, the method according to the invention can also be used for a range shift with a forward ratio step in the main transmission HG. This is appropriate for example in order to spare the unsynchronized shift clutches of the main transmission HG and to facilitate and support the synchronization of the shift clutches of the range group GP, especially in the case of cold synchronizations or ones affected by wear, or when shift problems arise for other reasons.

The load reduction in the step-down transmission is expediently accelerated and supported if, after or during the drive engine torque reduction, the separator clutch K is at least partially disengaged ($0 \leq K < 1$).

However, if the separator clutch K has been fully or partially disengaged during a range shift ($0 \leq K < 1$), then at the latest before the drive engine torque is increased (S5) to build up the torque, it is necessary to re-engage the separator clutch K completely (K=1) and this is carried out.

In the case of a range upshift the remote synchronization (S3) of the target ratio step in the range group GP is preferably carried out by means of appropriate actuation of the transmission brake (Br>0).

In contrast, in a range downshift the remote synchronization (S3) of the target ratio step in the range group GP expediently takes place by means of appropriate speed control of the drive engine, if necessary, i.e. when the separator clutch is at least partially disengaged ($0 \leq K < 1$), in combination with an at least partial engagement of the separator clutch ($0 < K \leq 1$).

In a range shift as described, i.e. in a range upshift or downshift, if the shift includes shifting of a synchronously shifted splitter group GV located upstream or downstream from the main transmission GV, then the splitter group GV is shifted from the existing to the target ratio step preferably immediately after the disengagement (S2) of the existing ratio step in the range group GP.

However, in a range upshift that includes shifting of a synchronously shifted splitter group GV located upstream or downstream from the main transmission HG, it is alternatively possible for the existing ratio step of the splitter group alone GV to be disengaged first, immediately after the disengagement (S2) of the existing ratio step in the range group GP, and then for the target ratio step of the splitter group GV to be engaged before the drive engine torque is increased (S5) to build up the load, if needs be, i.e. if the separator clutch is not completely disengaged ($0 < K \leq 1$), in combination with an immediately previous complete disengagement of the separator clutch (K=0) and in combination with an immediately following complete engagement of the separator clutch (K=1).

To speed up the process sequence, in both of the process variants described above the disengagement of the existing ratio step in the splitter group GV can in each case also take place at the same time as disengagement of the existing ratio step in the range group GP.

In this context 'drive engine' is understood to mean either an individual drive engine, or a system with more than one drive motor which, as a hybrid drive, is indirectly or directly connected to the input shaft of the step-down transmission. The hybrid drive can for example comprise an internal combustion engine and an electric motor, which can be operated individually or together as the drive engine.

Depending on the structure of the shift elements of the step-down transmission, problems can arise when the target transmission ratio step of the range group is to be engaged, which prevent a reliable engagement of the target ratio in the range group.

To improve the engagement of the target transmission ratio step in the range group, in an advantageous further development of the invention for the separate synchronization of the target ratio step in the range group an offset value is specified for the target speed of the target transmission ratio, by which the target speed is corrected.

According to an advantageous further development of the invention, for the separate synchronization of the target ratio step in the range group when the range shift is carried out, an offset value is specified for the target speed of the said target ratio in such manner that a locking action takes place during the separate synchronization, and this both during an upshift or a downshift, whether the vehicle be reversing or driving forward.

For this purpose, in a range shift to be carried out as an upshift while reversing a negative offset value is specified, so that the target speed of the target ratio step is reduced by the offset value. In contrast, for an upshift while driving forward a positive offset value is specified, so that when the target speed is corrected by the offset value the speed is increased. Remote synchronization when carrying out an upshift as a group shift takes place with corresponding actuation of the transmission brake Br.

If a downshift while reversing is to be carried out as a range shift, then to ensure a locking action, for the remote synchronization a positive offset value is specified, by which the target speed is increased. In contrast, for a downshift while driving forward a negative offset is specified, by which the target speed is reduced. For a downshift the remote synchronization is effected by corresponding speed control of the drive engine.

The offset values used in upshifts or downshifts when in reverse or driving forward to correct the target speed preferably amount to between 10 and 100 revolutions/minute, in particular between 20 and 50 revolutions/minute. With such offset values it can be ensured that synchronization, namely a locking action resulting therefrom, has the correct effect during the engagement of the target ratio step in the range group.

In another advantageous further development of the invention, for the separate synchronization of the target ratio step the target speed of the ratio step is corrected by the offset in such manner that during separate synchronization there is no locking effect.

If it is desired that during separate synchronization there should be no locking effect, i.e. when the target ratio step in the range group is engaged the synchronization is at once released, the offset values described above can be correspondingly inverted. In such a case, for an upshift while reversing a positive offset to increase the target speed, and for an upshift while driving forward a negative offset to reduce the target speed would be specified. Likewise, for downshifts the offset values would be correspondingly inverted.

When the target ratio step of the range group is engaged when the splitter group and the main transmission are or remain engaged, large forces resulting from large mass moments of inertia from the clutch to the main shaft of the step-down transmission are produced, which oppose the synchronization. To reduce these forces and thereby reduce the loading due to synchronization and the time required for it, according to a further development of the invention it is proposed, shortly before and/or during the engagement of the target ratio step of the range shift in the range group, to disengage the transfer or splitter group, and to re-engage the splitter group again when the target ratio step in the range group has been engaged.

In this case, throughout the range shift the same ratio step remains engaged in the main transmission, namely during the load reduction, the disengagement of the existing ratio step, the separate synchronization, the engagement of the target ratio step, and the load build-up.

Alternatively, it is possible for the ratio step to remain engaged in the main transmission only during the load reduction, the disengagement of the existing ratio step and the separate synchronizing of the target ratio step of the range shift, and that to assist shifting, shortly before and/or during the engagement of the target ratio step of the range shift the main transmission is disengaged and re-engaged again once the target ratio step has been engaged. If synchronous conditions do not exist in the main transmission at that time, then the main transmission must first be re-synchronized. This can be done with the transmission brake and/or the drive engine.

Thus, great shifting reliability can be achieved when engaging the target ratio step in the range group. The shift times can be made shorter. The life of the range group can be extended, since it is exposed to lower loads. With a synchronization that is for example only effective in the range group when driving forward, with the aid of the method according to the invention range shifts can also be carried out reliably and sparingly when reversing.

BRIEF DESCRIPTION OF THE DRAWINGS

To explain the invention further the description of a drawing with example embodiments is attached. The drawing shows.

DETAILED DESCRIPTION OF THE PREFERRED EMBODIMENTS

Figure 3:
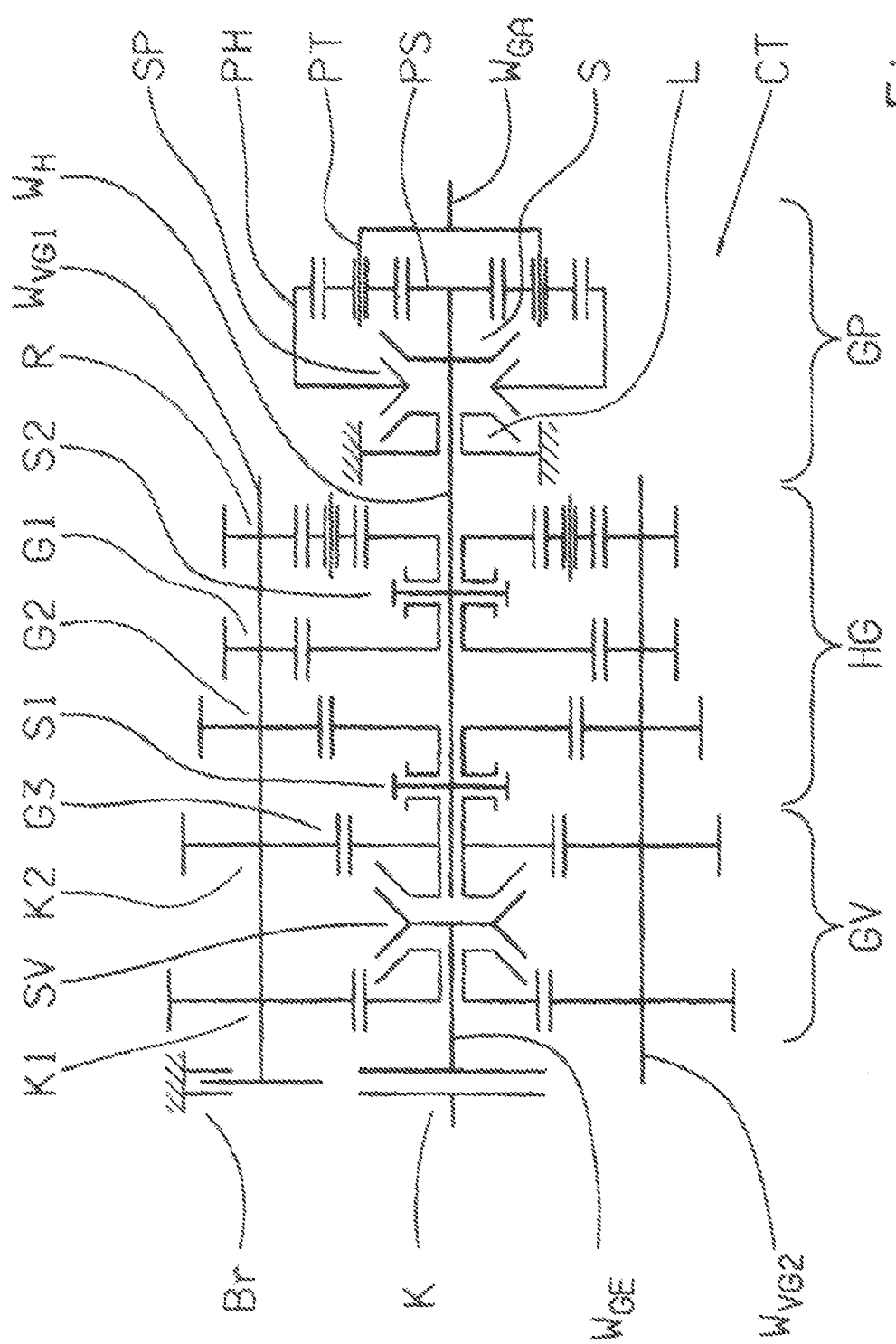
FIG. 3: Schematic structure of a step-down transmission, with which the method according to the invention can be used.

FIG. 3 shows an example of a step-down transmission CT with which the method according to the invention can be used. The step-down transmission CT comprises a main transmission HG, a splitter group GV upstream from and in drive connection with it, and a range group GP downstream from the main transmission HG, and in its configuration, relates to the design of a step-down transmission of the AS-Tronic series known per se.

The main transmission HG is made as a direct gear transmission of an intermediate transmission configuration and comprises a main shaft $W_H$ and two countershafts $W_{VG1}$, $W_{VG2}$, the first countershaft $W_{VG1}$ being provided with a controllable transmission brake Br. The main transmission HG is made as a three-step transmission with transmission ratio steps G1, G2 and G3 for forward driving and one ratio step R for reversing. The loose gearwheels for the ratio steps G1, G2 and R are each mounted to rotate on the main shaft $W_H$ and can be engaged by associated claw clutches. The associated fixed gearwheels are arranged in a rotationally fixed manner on the countershafts $W_{VG1}$, $W_{VG2}$. The highest ratio step G3, made as a direct gear, can be engaged by a direct shifting clutch. The shifting clutches of the ratio steps G3 and G2 and those of the steps G1 and R are assembled in respective common shift packets S1 and S2.

The splitter group GV is of two-step structure and also made in an intermediate transmission configuration, such that the two ratio steps K1, K2 of the splitter group GV form two shiftable input constants of the main transmission HG. By virtue of a small transmission ratio difference between the two ratio steps K1, K2, this transfer group is designed as a splitter group GV. The loose gearwheel of the first ratio step K1 is mounted to rotate on the input shaft $W_{GE}$, which is connected via a controllable separator clutch K to a drive engine (not shown) for example in the form of an internal combustion engine. The loose gearwheel of the second ratio step K2 is mounted to rotate on the main shaft $W_H$. The fixed gearwheels of the two ratio steps K1, K2 are respectively arranged, rotationally fixed, on the countershafts $W_{VG1}$, $W_{VG2}$ of the main transmission HG extended on the input side. The shift clutches of the splitter group GV, which are of synchronous design, are assemble in a common shift packet SV.

The range group GP, in drive connection with and downstream from the main transmission HG, is also of two-step configuration but made as a planetary structure with a simple planetary gearset. The sun gear PS is connected in a rotationally fixed manner to the main shaft $W_H$ of the main transmission HG extended on the output side. The planetary gear carrier PT is coupled in a rotationally fixed manner to the output shaft $W_{GA}$ of the step-down transmission CT. The ring gear PH is connected to a shift packet SP that comprises two synchronized shifting clutches, by means of which the range group GP can be shifted, alternatively, by connecting the ring gear PH to a fixed part of the housing for a slow-driving step L, or by connecting the ring gear PH to the main shaft $W_H$ or the sun gear PS for a fast-driving step S.

Figure 1:
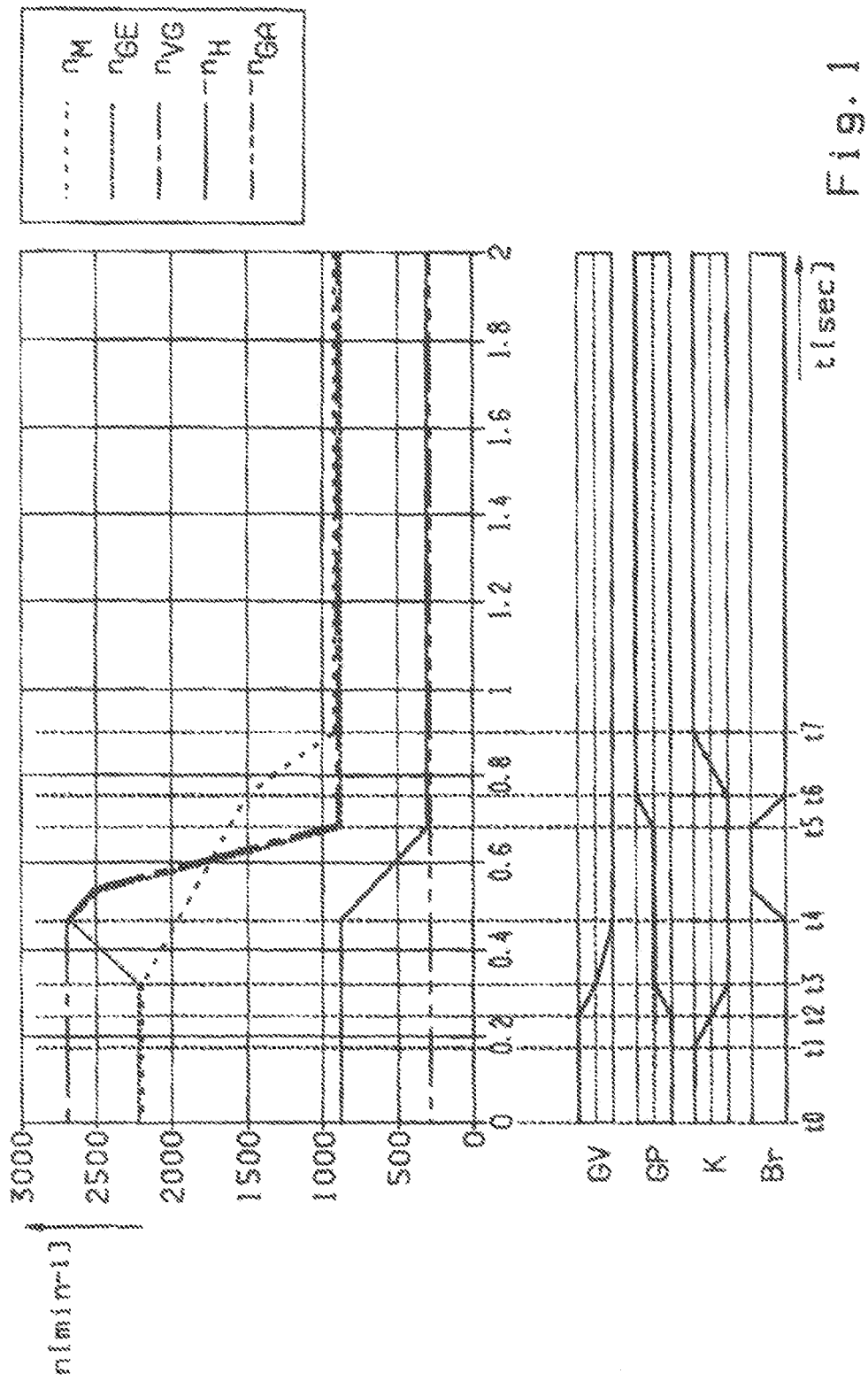
FIG. 1: A preferred sequence of a range upshift according to the method of the invention, in the form of a simplified time diagram.

Below, an example of a sequence according to the invention for a range upshift that can be carried out with the step-down transmission CT shown in FIG. 3 will be explained with reference to the diagram of FIG. 1. The upper part of FIG. 1 shows the time variations of the speed $n_M$ of the drive engine, the speed $n_{GE}$ of the input shaft $W_{GE}$, the speed $n_{VG}$ of the first countershaft $W_{VG1}$, the speed $n_H$ of the main shaft $W_H$ and the speed $n_{GA}$ of the output shaft $W_{GA}$ up to the end of the shift operation. The lower part of FIG. 1 shows a schematic representation of the actuation processes of the transmission elements, denoted as GV for shift processes within the splitter group GV, i.e. the engagement and disengagement of the ratio steps K1 and K2, GP for shift processes within the range group GP, i.e. the engagement and disengagement of the slow-driving step L and the fast-driving step S, K for the actuation of the separator clutch K, i.e. its engagement and disengagement, and Br for the actuation, i.e. the engagement or disengagement, of the transmission brake Br.

The range upshift depicted in FIG. 1 is carried out while driving in reverse, i.e. when the reversing ratio step R is engaged in the main transmission, this reversing ratio step R remains engaged throughout the shifting process. To reduce the ratio interval, the range upshift includes an upshift in the range group GP from the slow-driving step L to the fast-driving step S and a downshift in the splitter group from the "fast" input ratio step K2 to the "slow" input ratio step K1.

At time t0 load reduction begins with a drive engine torque reduction, which is completed at the latest by time t2. In parallel, beginning at time t1, the separator clutch K is pre-disengaged, i.e. it is disengaged to above the slipping limit. At time t2 the existing ratio step L in the range group GP is first disengaged, i.e. the range group GP is shifted to neutral (GP=N). Approximately at the same time the existing ratio step K2 in the splitter group GV is also disengaged (GV=N) and the separator clutch K is completely disengaged (K=0). Then, between times t3 and t4 the target ratio step K1 in the splitter group GV is synchronized and engaged.

After this, by correspondingly actuating the transmission brake Br between times t4 and t6 the countershaft $W_{VG1}$ and the main shaft $W_H$ connected thereto, by virtue of the existing ratio step R in the main transmission HG, are braked, and thereby the target ratio step S in the range group GP is remotely synchronized. When the synchronous speed is reached at the corresponding shifting clutch (KP) at time t5, the target ratio step S in the range group GP is engaged. Thereafter, the separator clutch K is completely engaged again between times t6 and t7, before the load build-up takes place by increasing the torque of the drive engine.

Next, a sequence according to the invention for a range downshift carried out with the step-down transmission CT shown in FIG. 3 will be explained with reference to the diagram of FIG. 2, using the same mode of representation as in FIG. 1.

Figure 2:
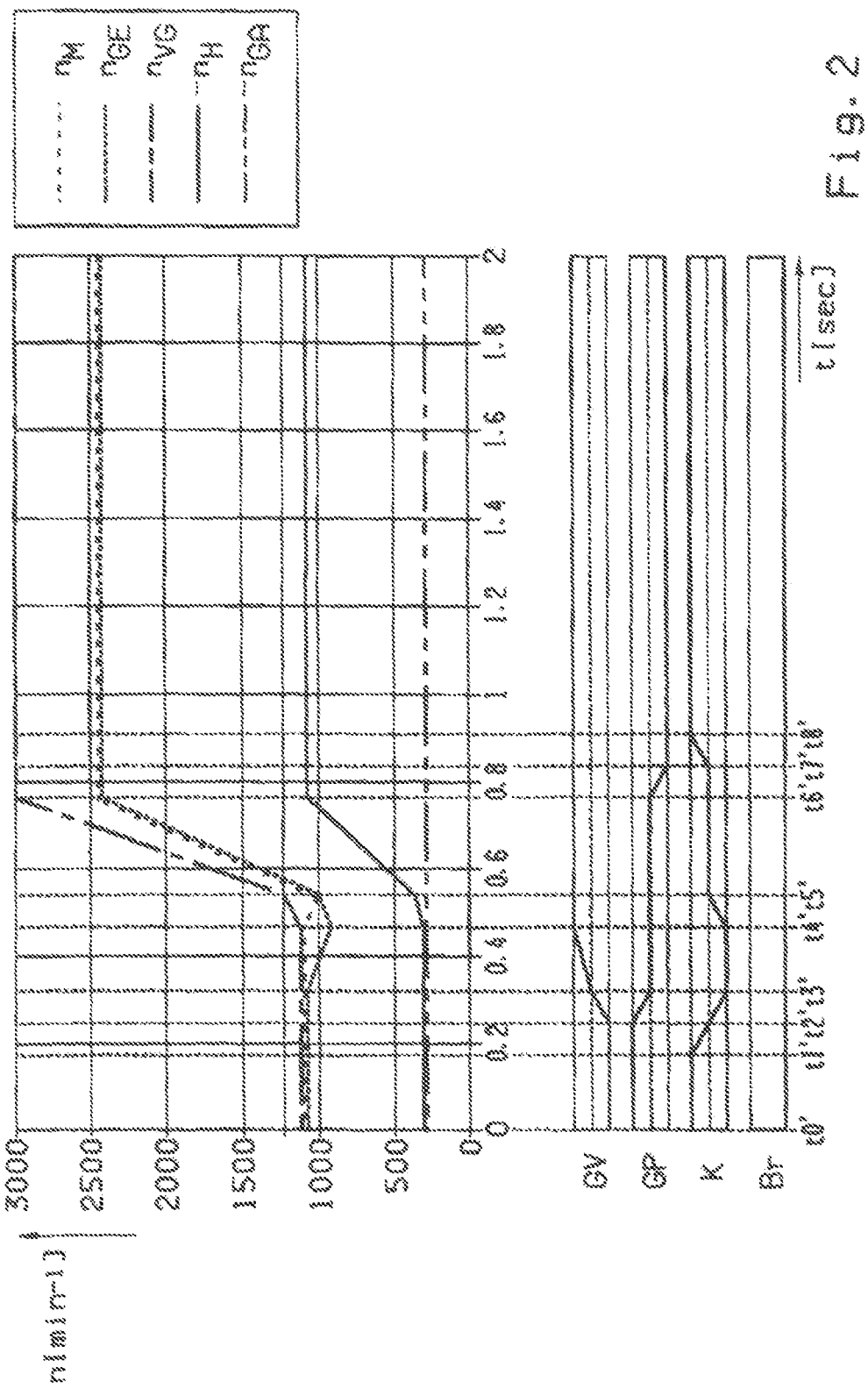
FIG. 2: A preferred sequence of a range downshift according to the method of the invention, in the form of a simplified time diagram.

The range downshift represented in FIG. 2 is also carried out while driving in reverse, i.e. with the reversing ratio step R engaged in the main transmission HG, this ratio step R remaining engaged throughout the shift operation. To reduce the ratio interval, the range downshift includes a downshift in the range group GP from the fast-driving step S to the slow-driving step L and an upshift in the splitter group from the "slow" input ratio step K1 to the "fast" input ratio step K2.

At time t0' the load reduction begins by reducing the drive engine torque, which is completed at the latest by time t2'. In parallel, starting at time t1' the separator clutch K is at first partially disengaged. Between times t2' and t3' the existing ratio step S in the range group GP is disengaged, i.e. the range group GP is shifted to its neutral position (GP=N). Approximately at the same time, the existing ratio step K1 in the splitter group GV is disengaged (GV=N) and the separator clutch K is fully disengaged (K=0). Then, between times t3' and t4' the target ratio step K2 in the splitter group GV is synchronized and engaged. Thereafter the separator clutch K is at least partially engaged again and after this, at time t5', the target ratio step L in the range group GP is remotely synchronized by corresponding speed control of the drive engine. When the synchronous speed has been reached at the corresponding shifting clutch (SP) at time t6', the target ratio step L in the range group GP is engaged. Thereafter, the separator clutch K starts being fully engaged from time t7' and at time t8' onward is fully engaged such that, the load build-up takes place by increasing the torque of the drive engine.

By virtue of the process sequences illustrated in FIGS. 1 and 2 relatively simply controllable shift processes are obtained, which can be carried out quickly and by which, in addition, the unsynchronized shifting clutches (S1, S2) of the main transmission HG and the synchronized clutches (SP) of the range group GP and the associated shift control elements are treated sparingly, so that their useful life is increased.

INDEXES

Br Transmission brake
CT Step-down transmission
GP Range group, planetary group
GV Splitter group, transfer group
G1 First transmission ratio step in HG
G2 Second transmission ratio step in HG
G3 Third transmission ratio step in HG
HG Main transmission
i Transmission ratio
$i_{GP}$ Transmission ratio in GP
$i_{HG}$ Transmission ratio in HG
$i_{HG\_min}$ Lowest transmission ratio in HG
K Separator clutch
K1 First input transmission ratio step in GV
K2 Second input transmission ratio step in GV
L Slow-driving step in GP
n Speed
N Neutral position
$n_{GA}$ Speed of $W_{GA}$
$n_{GE}$ Speed of $W_{GE}$
$n_H$ Speed of $W_H$
$n_M$ Speed of the drive engine
$n_{VG}$ Speed of $W_{VG1}$
PH Ring gear in GP
PS Sun gear in GP
PT Planetary carrier in GP
R Reversing transmission ratio step in HG
S Fast-driving step in GP
SP Shift packet in GP
S1 First shift packet in HG
S2 Second shift packet in HG
S1-S5 Process steps
SV Shift packet in GV
t Time
t0-t7 Times during a range upshift
t0'-t8' Times during a range downshift
W Transmission shaft
$W_{GA}$ Output shaft
$W_{GE}$ Input shaft
$w_H$ Main shaft
$W_{VG1}$ First countershaft of HG
$W_{VG2}$ Second countershaft of HG

The invention claimed is:

1. A method for controlling an automated step-down transmission (CT), the automated step-down transmission (CT) being arranged in a drivetrain of a motor vehicle, between either a drive engine or a hybrid drive and an drive axle, and comprising at least a multi-stage main transmission (HG) and a range group (GP) connected downstream from the main transmission (HG), the main transmission (HG) has an intermediate transmission configuration and at least one countershaft ($W_{VG1}$) that is engaged by a transmission brake (Br), an input shaft ($W_{GE}$) being connected, via a controllable separator clutch (K), to the drive engine or the hybrid drive, the main transmission (HG) being shiftable without synchronization and the range group (GP) being shifted, after synchronization, such that during a range shift, a transmission ratio step (R) that is engaged in the main transmission (HG), before the range shift, remains engaged after the range shift, the method of controlling the step-down transmission (CT) during the range shift comprising the steps of:

reducing a load, which is transmitted by the step-down transmission (CT), by reducing torque that is outputted by the drive engine or the hybrid drive;

disengaging a current ratio step (L; S) that is engaged in the range group (GP=N) before the range shift was initiated;

synchronizing a target ratio step (S; L) in the range group (GP) that is an objective of the range shift, during a range downshift, by appropriately controlling the torque that is outputted by the drive engine or the hybrid drive and, if necessary, at least partially engaging the separator clutch (0<K≦1);

engaging the target ratio step (S; L) in the range group (GP); and increasing the load, which is transmitted by the step-down transmission (CT), by increasing the torque that is output by the drive engine or the hybrid drive.

2. The method according to claim 1, further comprising the step of at least partially disengaging (0≦K<1) the separator clutch (K) either after or during the reduction of torque that is output by the drive engine or the hybrid drive.

3. The method according to claim 2, further comprising the step of fully reengaging (K=1) the separator clutch (K) before increasing the torque that is output by the drive engine or the hybrid drive.

4. The method according to claim 1, further comprising the step of separately synchronizing the target ratio step (S) in the range group (GP) during a range upshift by appropriately actuating the transmission brake (Br>0).

5. The method according to claim 1, further comprising the step of immediately disengaging an existing ratio step (K1;

K2) in a splitter group (GV) after disengaging the current ratio step (L; S) in the range group (GP), and engaging a target ratio step (K2; K1) in the splitter group (GV) before increasing the torque that is output by the drive engine of the hybrid drive, if necessary, in combination with an immediately previous full disengagement of the separator clutch (K=0) and in combination with an immediately subsequent full engagement of the separator clutch (K=1), during a range upshift that includes shifting a splitter group (GV), which is either upstream or downstream from the main transmission (HG), and that is shiftable when synchronized.

6. The method according to claim 1, further comprising the step of correcting the target speed of the target ratio step by the offset value during remote synchronization of the target ratio step (S; L) in the range group (GP) so as to avoid producing a locking effect.

7. A method of controlling an automated step-down transmission (CT), the automated step-down transmission (CT) being arranged in a drivetrain of a motor vehicle, between either a drive engine or a hybrid drive and an drive axle, and comprising at least a multi-stage main transmission (HG) and a range group (GP) connected downstream from the main transmission (HG), the main transmission (HG) having an intermediate transmission configuration and at least one countershaft ($W_{VG1}$) that being engaged by a transmission brake (Br), an input shaft ($W_{GE}$) being connected, via a controllable separator clutch (K), to the drive engine or the hybrid drive, the main transmission (HG) being shiftable without synchronization and the range group (GP) being shifted, after synchronization, such that during a range shift, a transmission ratio step (R) that is engaged in the main transmission (HG), before the range shift, remains engaged after the range shift, the method of controlling the step-down transmission (CT) during the range shift comprising the steps of:
reducing a load, which is transmitted by the step-down transmission (CT), by reducing torque that is outputted by the drive engine or the hybrid drive;
disengaging a current ratio step (L; S) that is engaged in the range group (GP=N) before the range shift was initiated;
shifting the splitter group (GV) from an existing ratio step (K1; K2) to a target ratio step (K2; K1), immediately after the current ratio step (L; S) in the range group (GP) has been disengaged, during a range shift that includes shifting a splitter group (GV), which is either upstream or downstream from the main transmission (HG), and that is shiftable when synchronized;
synchronizing a target ratio step (S; L) in the range group (GP) that is an objective of the range shift;
engaging the target ratio step (S; L) in the range group (GP); and
increasing the load, which is transmitted by the step-down transmission (CT), by increasing the torque that is output by the drive engine or the hybrid drive.

8. The method according to claim 7, further comprising the step of disengaging the existing ratio step (K1; K2) in the splitter group (GV) at the same time of disengaging the current ratio step (L; S) in the range group (GP).

9. A method of controlling an automated step-down transmission (CT), in which the automated step-down transmission (CT) is arranged in a drivetrain of a motor vehicle between either a drive engine or a hybrid drive and an drive axle, comprises at least a multi-stage main transmission (HG) and a range group (GP), which is connected downstream from the main transmission (HG), the main transmission (HG) having an intermediate transmission configuration and at least one countershaft ($W_{VG1}$) that is engaged by a transmission brake (Br), an input shaft ($W_{GE}$) being connected, via a controllable separator clutch (K), to the drive engine or the hybrid drive, the main transmission (HG) being shiftable without synchronization and the range group (GP) being shifted after synchronization such that during a range shift a transmission ratio step (R) that is engaged in the main transmission (HG), before the range shift, remains engaged after the range shift, the method of controlling the step-down transmission (CT) during the range shift comprises the steps of:
reducing a load, which is transmitted by the step-down transmission (CT), by reducing torque that is output by the drive engine or the hybrid drive;
disengaging a current ratio step (L; S) that is engaged in the range group (GP=N) before the range shift was initiated;
remotely synchronizing a target ratio step (S; L) in the range group (GP) that is the objective of the range shift by an specifying an offset value for a target speed of the target ratio step (S; L), by which the target speed is corrected;
engaging the target ratio step (S; L) in the range group (GP); and
increasing the load, which is transmitted by the step-down transmission (CT), by increasing the torque that is output by the drive engine or the hybrid drive.

10. The method according to claim 9, further comprising the step of correcting the target speed of the target ratio step by the offset value for remotely synchronizing the target ratio step such that during remote synchronization a locking effect is produced.

11. The method according to claim 10, further comprising the step of specifying a negative offset value to reduce the target speed, during an upshift while reversing, and specifying a positive offset value during an upshift while driving forward, to increase the target speed.

12. The method according to claim 11, further comprising the step of remotely synchronizing the target ratio step in the range group with the transmission brake (Br) during an upshift.

13. The method according to claim 10, further comprising the step of specifying a positive offset value during a downshift while reversing so that the target speed is increased, and specifying a negative offset value during a downshift while driving forward so that the target speed is reached.

14. The method according to claim 13, further comprising the step of remotely synchronizing the target ratio step (S; L) in the range group (GP), during a downshift, with either the drive engine or the hybrid drive.

15. The method according to claim 9, further comprising the step of maintaining engagement of the ratio step in the main transmission (HG), and a splitter group (GV), upstream from the main transmission (HG), is at least one of disengaged shortly before and during the engagement of the target ratio step of the range shift, and re-engaged again after the engagement of the target ratio step, during the load reduction, the disengagement of the existing ratio step, the remote synchronization of the target ratio step, the engagement of the target ratio step and the load build-up stages of the range shift.

16. The method according to claim 9, further comprising the step of maintaining engagement of the ratio step in the main transmission, disengaging the main transmission (HG) at least shortly before and during the engagement of the target ratio step of the range shift, and re-engaged again after the engagement of the target ratio step, during the load reduction, the disengagement of the existing ratio step and remote synchronization of the target ratio step of the range shift.

* * * * *